H. C. CARSON.
GEARING FOR VEHICLE SIGNALS.
APPLICATION FILED JUNE 24, 1920.
1,382,624.
Patented June 28, 1921.
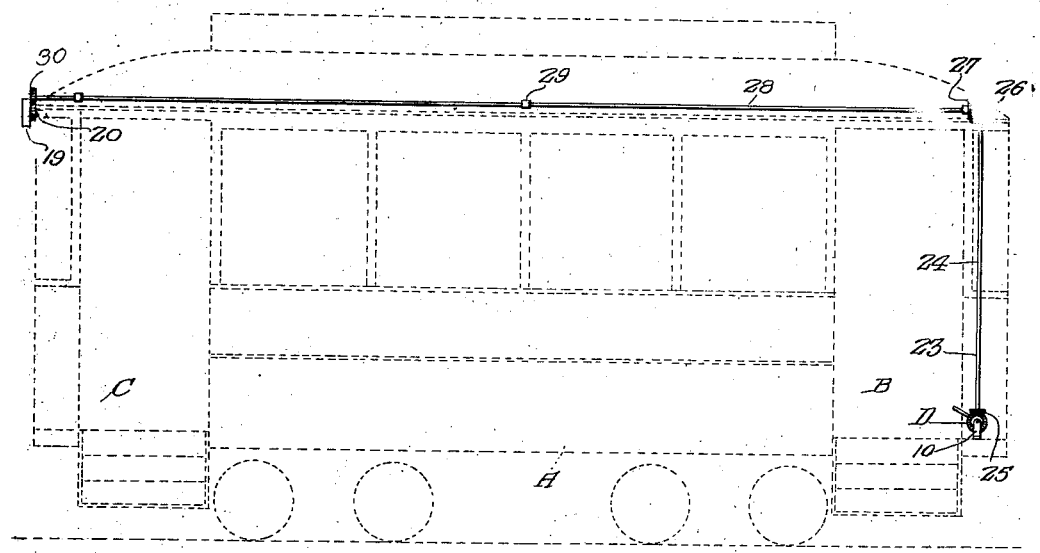
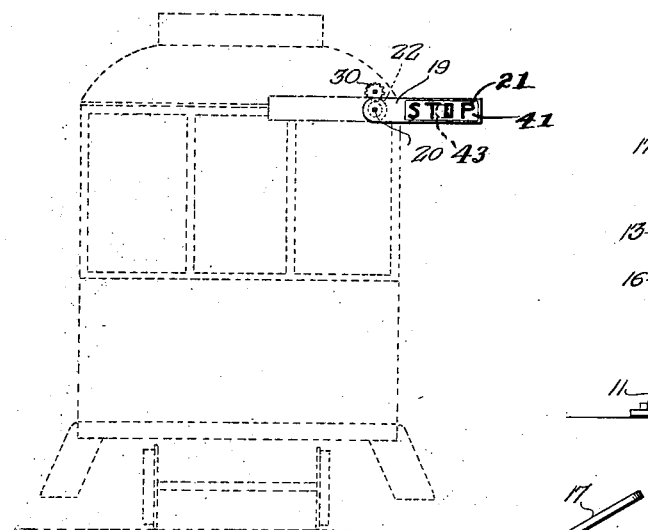
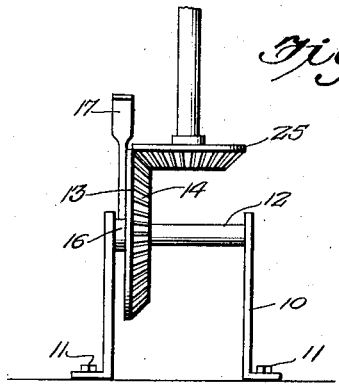
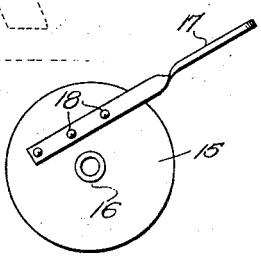
WITNESSES
INVENTOR
H.C. Carson,
BY
ATTORNEYS

UNITED STATES PATENT OFFICE.

HARRY C. CARSON, OF CHEVIOT, OHIO.

GEARING FOR VEHICLE-SIGNALS.

1,382,624. Specification of Letters Patent. Patented June 28, 1921.

Application filed June 24, 1920. Serial No. 391,313.

*To all whom it may concern:*

Be it known that I, HARRY C. CARSON, a citizen of the United States, and a resident of Cheviot, in the county of Hamilton and State of Ohio, have invented certain new and useful Improvements in Gearing for Vehicle-Signals, of which the following is a specification.

My invention relates generally to vehicle signals, and more particularly to an improved signal especially adapted for use upon street railway cars and automobiles and other vehicles.

An important object of the invention is to provide an improved vehicle signal of this character of simple and durable construction, which may be controlled by the driver or operator of the vehicle without detracting from his capacity to control the vehicle, and which will effectively advise the adjacent vehicles of intended changes in the speed and motion generally.

Other objects and advantages of the invention reside in certain novel features of construction, combination and arrangement of parts which will be hereinafter more fully described and particularly pointed out in the appended claim, reference being had to the accompanying drawings forming part of this specification and in which:

Figure 1 is a side elevational view, showing my invention applied to a street railway car;

Fig. 2 is a rear elevational view, showing the semaphore of the signal thrown to signaling position;

Fig. 3 is a detail elevational view of the operating mechanism; and

Fig. 4 is a detail view in side elevation of the driving disk and foot pedal.

Referring to Figs. 1 to 4 of the drawing, it will be seen that this embodiment of my invention contemplates a railway vehicle, such as a street car, or the like, indicated at A, the front or drive end of which is indicated at B and the rear end of which is indicated at C. The operator of the vehicle is stationed at B and through suitable control mechanism (not shown) exercises the control of the railway vehicle.

The operating mechanism for the signal, indicated generally at D, is located at the front end B of the vehicle adjacent the feet of the operator so that he may actuate the operating mechanism without in any way affecting his capacity to control the vehicle. This operating mechanism consists of a bracket including spaced uprights 10 having their lower ends turned outwardly and secured by fastening means 11 to the floor of the vehicle. A shaft 12 is journaled in the upper end of the uprights and carries a driving disk 13 which has a beveled gear 14 formed on one face and which has its opposite face smooth, as indicated at 15, in Fig. 4. A suitable spacing sleeve 16 spaces the driving disk from the adjacent upright. A foot pedal 17 is secured, as at 18, to the smooth face 15 of the driving disk and is arranged eccentrically of the driving disk whereby when the operator depresses the foot pedal the driving disk 13 is rotated.

A signal which consists of a semaphore 19 is pivoted, as at 20, to the rear of the vehicle. As shown in the drawings the semaphore is provided with suitable signaling means, such as indicia 21. A driven pinion 22 is carried by the semaphore concentric with the pivot 20 thereof.

Means is provided for effectively and efficiently transmitting the motion of the beveled gear of the driving disk to the driven disk of the semaphore. This means consists of a vertical shaft 23 journaled in suitable bearings 24 and having at its lower end a beveled pinion 25 meshing with the beveled gear 14 of the driving disk. The upper end of the vertical shaft 23 carries a beveled pinion 26 which in turn meshes with the beveled pinion 27 carried at one end of the horizontal shaft 28 which extends longitudinally of the vehicle being journaled in suitable bearings, indicated at 29. The opposite end of the shaft 28 carries a driving pinion 30 which meshes with the driven pinion 22 of the semaphore to transmit the motion thereto.

In operation of my invention, it is only necessary for the operator of the vehicle to depress the foot pedal 17 if he desires to advise the following vehicles of intended changes in the speed or motion of the car. This depression of the foot pedal rotates the driving disk and the motion of the driving disk through the motion transmission mechanism swings the semaphore from the inoperative position outwardly into operative signaling position, as indicated in full lines in Fig. 2. It is to be noted that in this form of the invention the pinion 14 may be loosely mounted on the shaft 12 and it is not especially essential to design special means to prevent it from longitudinal displacement on the shaft as the beveled gear 25 prevents such displacement in one direction and the sleeve 16 prevents displacement in the opposite direction.

In the use of my signal at night, it is desirable to illuminate the same, and to this end the signal may be made as a chamber which is covered by a suitable transparent panel 41 carrying the opaque signaling indicia 21 referred to. Within the chamber an electric bulb 43 or other illuminating means is carried and serves to illuminate the signaling means.

Having thus described my invention, I claim:

In a device of the character described adapted to actuate a signal, a bracket disposed adjacent the foot of the operator and including spaced uprights, a shaft journaled in said uprights, a driving disk rotatably mounted on said shaft and having a beveled gear on one face and having its opposite face smooth, a foot pedal secured to the smooth face of the driving disk eccentric thereof, a spacing sleeve arranged on said shaft and spacing the driving disk from one of the uprights, and motion transmission means including a beveled gear engaging the beveled gear of the driving disk to receive the motion therefrom and coacting with the spacing sleeve for maintaining the driving disk in position on the shaft.

HARRY C. CARSON.